(12) United States Patent
Beachem (10) Patent No.: US 8,838,804 B2
(45) Date of Patent: Sep. 16, 2014

(54) SECURING A NETWORK CONNECTION BY WAY OF AN ENDPOINT COMPUTING DEVICE

(75) Inventor: Brent R. Beachem, Riverton, UT (US)

(73) Assignee: Novell, Inc., Provo, UT (US)

(*) Notice: Subject to any disclaimer, the term of this patent is extended or adjusted under 35 U.S.C. 154(b) by 1019 days.

(21) Appl. No.: 12/381,624

(22) Filed: Mar. 12, 2009

(65) Prior Publication Data

US 2010/0235514 A1   Sep. 16, 2010

(51) Int. Cl.
*G06F 15/16* (2006.01)
*G06F 21/57* (2013.01)
*H04L 29/06* (2006.01)

(52) U.S. Cl.
CPC ............... *H04L 63/20* (2013.01); *G06F 21/57* (2013.01); *G06F 2221/2111* (2013.01); *G06F 2221/2151* (2013.01)
USPC ............................... 709/227; 709/238; 726/1

(58) Field of Classification Search
None
See application file for complete search history.

(56) References Cited

U.S. PATENT DOCUMENTS

| | | | |
|---|---|---|---|
| 6,327,660 B1 | 12/2001 | Patel | |
| 6,754,188 B1* | 6/2004 | Garahi et al. | 370/328 |
| 6,996,706 B1 | 2/2006 | Madden et al. | |
| 7,082,117 B2 | 7/2006 | Billhartz | |
| 7,165,170 B2 | 1/2007 | Rothman et al. | |
| 7,206,931 B2 | 4/2007 | Zimmer et al. | |
| 7,237,102 B2 | 6/2007 | Rothman | |
| 7,243,224 B2 | 7/2007 | Nair et al. | |
| 7,257,704 B2 | 8/2007 | O'Neal | |
| 7,308,703 B2 | 12/2007 | Wright et al. | |
| 7,320,052 B2 | 1/2008 | Zimmer et al. | |
| 7,346,167 B2 | 3/2008 | Billhartz et al. | |
| 7,353,533 B2 | 4/2008 | Wright et al. | |
| 7,412,595 B2 | 8/2008 | Velhal et al. | |
| 7,426,179 B1 | 9/2008 | Harshavardhana et al. | |
| 7,448,030 B2 | 11/2008 | Lin et al. | |
| 7,460,489 B2 | 12/2008 | Sugiarto et al. | |
| 7,478,420 B2 | 1/2009 | Wright et al. | |
| 2002/0072391 A1 | 6/2002 | Itoh | |
| 2002/0161905 A1* | 10/2002 | Haverinen et al. | 709/229 |

(Continued)

OTHER PUBLICATIONS http://en.wikipedia.org/wiki/Wimax; "WiMax"; Page last modified on Feb. 3, 2009; 18 pages.

(Continued)

*Primary Examiner* — Hee Soo Kim
*Assistant Examiner* — Clayton R Williams
(74) *Attorney, Agent, or Firm* — King & Schickli, PLLC (57) ABSTRACT

Methods and apparatus involve securing a network connection by way of mobile, endpoint computing assets. The endpoints have one or more pre-defined security policies governing the connection that are balanced against competing interests of actually maintaining connections between devices, especially in WiMAX, MANET, MESH, or other ad hoc computing environments where poor security, signal strength, fragile connections or mobility issues are of traditional concern. In this manner, connections will not be lost over security enforcement in an otherwise hostile environment. The security policies are enforced in a variety of ways, but may be altered to lesser policies or not-so-strictly enforced so as to maintain satisfactory connections between devices. Other embodiments contemplate analyzing connectivity components before connection and selecting only those components that enable full or best compliance with the policies. Still other embodiments contemplate altering connections in order to maintain full enforcement of policies. Computer program products are also disclosed.

19 Claims, 8 Drawing Sheets

(56) References Cited

U.S. PATENT DOCUMENTS

| | | | |
|---|---|---|---|
| 2003/0041136 | A1 | 2/2003 | Cheline et al. |
| 2005/0166213 | A1 | 7/2005 | Cromer et al. |
| 2006/0094400 | A1* | 5/2006 | Beachem et al. ............. 455/410 |
| 2007/0107043 | A1* | 5/2007 | Newstadt et al. ................. 726/2 |
| 2007/0192867 | A1 | 8/2007 | Miliefsky |
| 2007/0198819 | A1 | 8/2007 | Dickens et al. |
| 2007/0266120 | A1 | 11/2007 | Tallieu et al. |
| 2007/0294520 | A1 | 12/2007 | Leigh et al. |
| 2008/0034416 | A1 | 2/2008 | Kumar et al. |
| 2008/0043760 | A1 | 2/2008 | Venkatraman et al. |
| 2008/0095067 | A1 | 4/2008 | Rao |
| 2008/0144590 | A1 | 6/2008 | Rantanen et al. |
| 2008/0147830 | A1 | 6/2008 | Ridgill et al. |
| 2008/0212503 | A1 | 9/2008 | Lipford et al. |
| 2008/0291841 | A1 | 11/2008 | Joung et al. |
| 2009/0007246 | A1* | 1/2009 | Gutowski et al. ................. 726/6 |
| 2009/0019170 | A1* | 1/2009 | Wyss et al. .................... 709/229 |
| 2009/0037763 | A1 | 2/2009 | Adhya et al. |
| 2009/0043891 | A1 | 2/2009 | Woo et al. |
| 2009/0213849 | A1* | 8/2009 | Sachs et al. ................... 370/389 |
| 2010/0058442 | A1* | 3/2010 | Costa et al. ....................... 726/3 |
| 2010/0153696 | A1 | 6/2010 | Beachem et al. |
| 2010/0235514 | A1 | 9/2010 | Beachem |
| 2010/0293610 | A1 | 11/2010 | Beachem et al. |
| 2012/0096510 | A1* | 4/2012 | Bentall ............................. 726/1 |

OTHER PUBLICATIONS http://en.wikipedia.org/wiki/Mesh networking; "Mesh networking"; Page last modified on Feb 1, 2009; 4 pages.

http://www.novell.com/products/zenworks/endpointsecuritymanagement; Novell ZENworks Endpoint Security Management; Printed on Feb. 3, 2009; 1 page.

http://www.novell.com/products/zenworks/endpointsecuritymanagement/productinfo "Novell ZENworks Endpoint Security Management"; Printed Feb. 3, 2009; 1 page.

http://www.novell.com/rc/docrepository/public/37/basedocument.2007-08-10.2324835973/4622065 en.pdf, Novell ZENworks Endpoint Security Managment; Total Control from a Single "Consol" Printed on Feb. 3, 2009; 11 pages.

http://www.novell.com/rc/docrepository/public/25/basedocument.2008-03-13.5186701808/securing the corporate desktop presentation en.pdf, "Novell Endpoint Securing Management"; Printed Feb. 3, 2009; 32 pages.

http://www.novell.com/rc/docrepository/public/16/basedocument.2008-03-12.2205304456/4641033 n.pdf, "Novell ZENworks Endpoint Security Management"; Printed Feb. 3, 2009; 27 page.

Office Action in U.S. Appl. No. 12/316,466 dated Aug. 10, 2011.

http://computer.howstuffworks.com/vpn10.htm; "How Virtual Private Networks Work"; Jeff Tyson; Printed May 5, 2009; 5 Pages.

http://en.wikipedia.org/wiki/VPN; "Virtual private network"; Page last modified on Apr. 22, 2009; 8 Pages.

http://www.nacs.uci.edu/security/vpn/vpninfo.html#why; "VPN Information"; Updateed: Feb. 4, 2008; 2 Pages.

"Microsoft Internet Security & Acceleration Server, ISA Server 2006 Firewall Core"; Jun. 2006; 23 Pages.

Preboot Execution Environment (PXE) Specification, Version 2.1, Sep. 20, 1999, Intel Corporation, 103 pages.

Preboot Execution Environment, Updated Aug. 14, 2008, Wikipedia, http://en.wikipedia.org/wiki/Preboot_Execution_Environment, 5 pages.

http://en.wikipedia.org/wiki/Mesh_networking; "Mesh networking"; Page last modified on Feb. 1, 2009; 4 Pages.

http://www.novell.com/products/zenworks/endpointsecuritymanagement/; "Novell ZENworks Endpoint Security Management"; Printed on Feb. 3, 2009; 1 Page.

http://www.novell.com/products/zenworks/endpointsecuritymanagement/productinfo; "Novell ZENworks Endpoint Security Management"; Printed on Feb. 3, 2009; 1 Page.

"Novell ZENworks Enpoint Security Managment: Total Control from a Single Console", Printed on Feb. 3, 2009; 11 Pages.

"Novell Endpoint Security Management"; Printed on Feb. 3, 2009; 32 Pages.

"Novell ZENworks Endpoint Security Management";.Printed on Feb. 3, 2009; 27 Pages.

U.S. Appl. No. 12/316,466 Office Action dated Oct. 17, 2011.
U.S. Appl. No. 12/467,553 Office Action dated Aug. 10, 2011.
U.S. Appl. No. 12/467,553 Office Action dated Nov. 30, 2011.

* cited by examiner

SECURING A NETWORK CONNECTION BY WAY OF AN ENDPOINT COMPUTING DEVICE

FIELD OF THE INVENTION

Generally, the present invention relates to computing devices and computing environments involving endpoint assets, such as laptops, PDAs, phones, etc. for an enterprise or other entity. Particularly, although not exclusively, it relates to securing network connections from the endpoint including connections using WiMAX (Worldwide Interoperability for Microwave Access), Mesh, MANET (Mobile Ad hoc Network), or other ad hoc, person-to-person or traditional network environments. The invention also relates to the field of computing tasks in a mobile computing environment as endpoint assets move between locations during use. Other features contemplate computing arrangements, computing architecture and computer program products, to name a few.

BACKGROUND OF THE INVENTION

Today, corporate computing assets, such as laptops, phones, PDAs, etc., are utilized outside corporate firewalls more than ever before. With ever more employees either working from home or "on the road," controlling and managing corporate information technology (IT) assets is becoming a difficult or serious problem. Also, as networks become ubiquitous, computing assets are able to connect in a variety of ways as they move about during use, including connecting in MANET, Mesh, WiMAX or other network environments. Each of these networks, however, suffer their own shortcomings, such as poor security, variable signal strength, fragile connections and/or complications introduced by mobility of assets.

For example, Mesh relies on ad hoc or "peer to peer" connections to extend the distance or envelope of a Mesh neighborhood. If wireless connections are used, they are unfortunately regarded as exceptionally insecure forms of communicating. Namely, users are left to their own devices when establishing security which often results in rudimentary or non-existent levels. The problem is further compounded in a MANET, whereby nodes are able to move about. As can then be seen, corporate assets connecting in this manner risk security not only to the hardware and data files of the asset, but also to the entire corporate enterprise when infected devices are brought behind and used inside the corporate firewall. With the advent of virtual computing devices, problems are even further exacerbated since a single hardware platform will often guest many virtual computing devices, each with potentially vastly different operating systems, drivers, interfaces, etc., and its own ability to make network connections.

Like Mesh, WiMAX relies on connections made through cellular devices/networks and 802.11 wireless networks. Given that the inceptive intent of WiMAX, as well as Mesh, focused mostly on maximizing network coverage, making connection availability omnipresent, and delivering strong signals everywhere, security measures began and evolved poorly and now cannot be readily enforced on the infrastructure side of the network. As is presently the situation, the primary means for securing Mesh/WiMAX networks is by way of enterprise or business infrastructure devices, such as access points setup as repeaters or ad hoc hubs, that initialize these devices with some level of security (typically 802.11 security means readily available today). They do not dictate and/or govern the devices subsequently, however, and the devices are free to act as their own repeater and/or ad hoc connection with other devices, including any level of security they desire. Of course, this obviates policy enforcement by the enterprise. In the specific situation of WiMAX, enterprises are further unable to control cellular security which is wholly left to the control of third party services providing and administering the cellular environment. Therefore, the security of these types of connections are almost completely removed from enterprise control.

Accordingly, a need exists in the art of endpoint computing assets for better security, policies and control in network environments, especially those with traditionally poor or little security. Also, such need should contemplate balancing network coverage area, connectivity and strength of signal so as to prevent security concerns from making computing connections unstable, e.g., intermittent or non-existent. Even more, the need should extend to virtual environments, each with many domains per a single hardware platform, and to mobile environments as assets move about during use. Naturally, any improvements along such lines should further contemplate good engineering practices, such as simplicity, cost and time economics, unobtrusiveness, etc.

SUMMARY OF THE INVENTION

The foregoing and other problems become solved by applying the principles and teachings associated with the hereinafter described securement of network connections by endpoint computing devices. Among other things, the invention is suited for designating which computing devices connect in the environment, how they connect, and what information can be exchanged. In accomplishing this, the invention provides endpoints with one or more pre-defined security policies governing connections that are balanced against competing interests of maintaining stable connections between devices, especially in WiMAX, MANET, Mesh, or other ad hoc or person-to-person environments. In this manner, connections will not be lost because of rigid application of security in an otherwise hostile computing environment.

The policies may be resident with the endpoint or pushed from an enterprise device, such as a host server, or exist on both, or elsewhere. Also, the policies can be evaluated for currentness and updated occur over time. In certain other embodiments, the policies can: control connectivity components in the endpoint, such as network cards, modems, adapters, etc.; specify brands of components for connection according to inherent security features therein; specify third party carrier companies and their security features which enable the computing connection, e.g., the cellular environment; specify technologies, such as 802.11a/b/g/j/h/p (WiFi), 802.1 (general LAN), 3G, 4.9 GHz public spectrum (Motorola brand systems available), hazy-sighted link state (HSLS) routing protocol; or the like.

During use, the security policies are enforced on the endpoint, but may be altered to lesser or alternate policies or not-so-strictly enforced in order to maintain satisfactory connections between devices. Still other embodiments contemplate analyzing connectivity components before connection and only selecting those components that enable full or best compliance with the policies. Still other embodiments contemplate altering the computing connections, but keeping the policies fully enforced. In practicing the foregoing, policy enforcement may be implemented as a function of a present location of the computing device, types of data used in network trafficking; VPN enforcement; application patching; adjusting/monitoring firewall settings; (dis)allowing data or executable instructions from removable media or networks; managing certificates or encryption, or the like.

In certain hardware embodiments, a platform of the computing device includes a processor(s), memory (RAM, ROM, etc.) and available remote or local storage. A policy control module configured on or with the operating system exists to enforce the security policy regarding computing connections. Also, the hardware platform can be configured to carry multiple computing domains in a virtual environment by way of a hypervisor or other managing layer for scheduling control of various domains on the assets of the physical environment. As such, each domain or select domains can also have a policy control module for undertaking the foregoing. Similarly, the module can be shared commonly.

Executable instructions loaded on one or more computing devices for undertaking the foregoing are also contemplated as are computer program products available as a download or on a computer readable medium. The computer program products are also available for installation on a network appliance or individual computing devices. Retrofitting of existing computer products, such as Novell's ZENworks Endpoint Security Management (ZESM), will serve to minimize costs of implementation.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for securement of network connections by endpoint computing devices.

Figure 1:
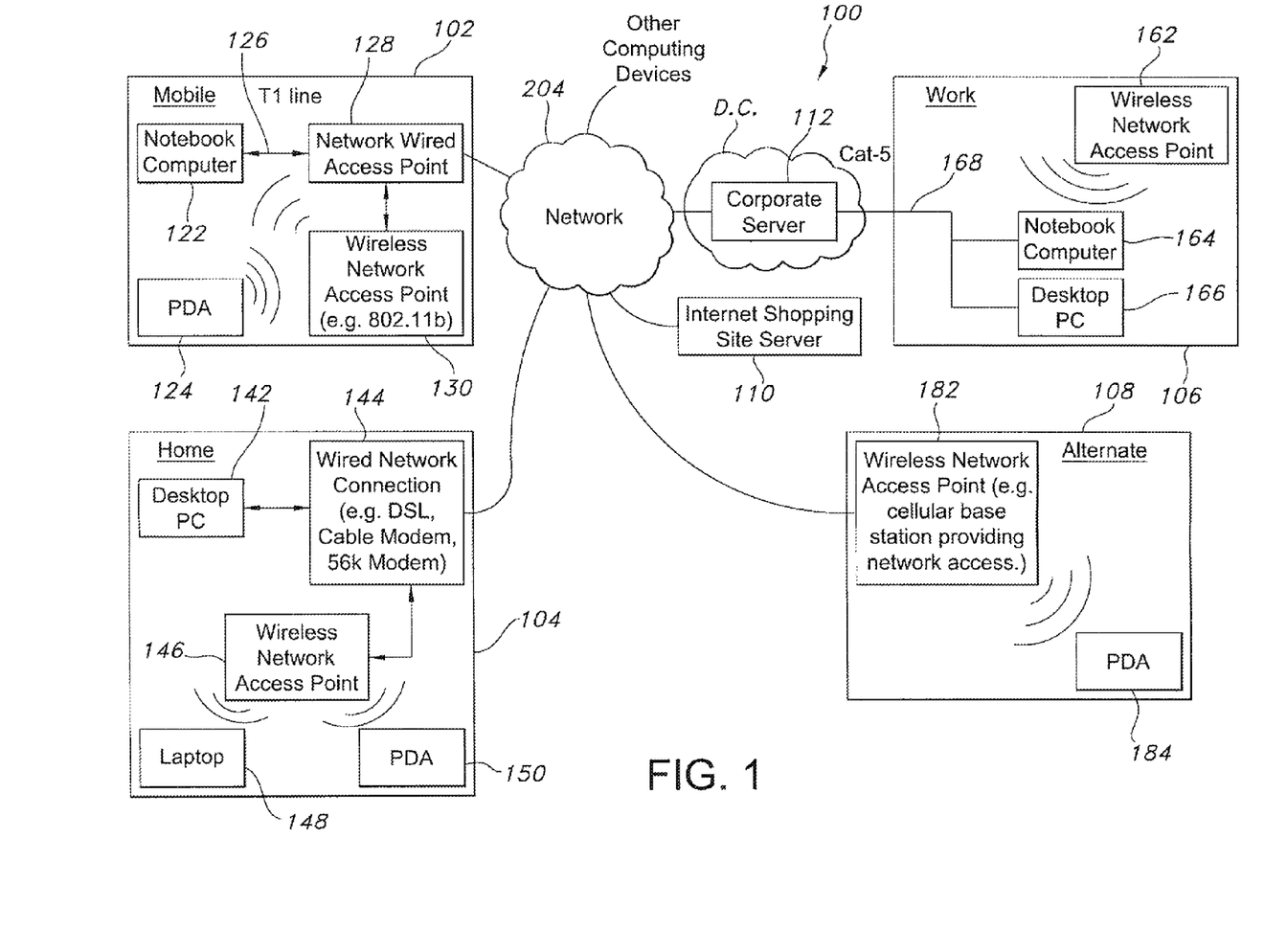
FIG. 1 is a diagrammatic view in accordance with the present invention of a representative computing environment in which an endpoint computing device may operate.

With reference to FIG. 1, a representative computing environment in which an endpoint asset or computing device will operate is given generally as 100. In category, one or more locations 102, 104, 106, 108 are available in which the endpoint may operate in the environment. Also, the asset represents a range of electronic systems (either wired or wireless) including, for example, general or special computers, desktops or laptops, phones, personal digital assistants (PDAs), audio players, or any other electronic device sophisticated enough to have an operating system and able to communicate with other electronic devices.

In a first location category, "Home" 104 is an example of a user's house, apartment, etc. whereby user's fairly often conduct work with an asset of their employer. In this category, each of endpoint computing devices 148 and 150 communicate wirelessly via a wireless network access point (NAP) 146, in turn connected to a larger network at 144. Alternatively, an endpoint computing device in the form of a desktop 142 communicates via a network connection at 144 that is directly wired.

In a second category, the location "Work" 106 is an example of a network environment maintained by a user's employer, such as a corporation or other enterprise. In the illustration, endpoints in the form of notebook and desktop computers 164, 166 have a wired CAT-5 Ethernet connection 168 to a corporate server 112, in turn, connected to other networks such as the Internet. Alternatively, the notebook computer 164 may also communicate with the server 112 through a wireless NAP 162 as illustrated. In either, skilled artisans generally associate these devices with being behind an enterprise firewall, and other appliances will likely exist as part of a larger data center (DC) environment.

In a third category, the location "Mobile" 102 represents environments such as those found at airports, hotels, restaurants, or the like, or even trains, airplanes, cruise ships, cars, etc. As such, an endpoint device, such as the illustrated notebook computer 122, might access a wired NAP 128 through a Tx line 126 and gain access to an Internet shopping site server 110 because the user desires to browse the site while awaiting an airline departure. On the other hand, the notebook computer 122 and PDA 124 might wirelessly connect to a wireless NAP 130, in this example an 802.11b connection, through which they communicate at the airport, for instance.

In a last category, an "Alternate" location is given as 108. In this environment, it is contemplate that a dedicated infrastructure might exist, such as a university campus, in which the endpoint is operating, but otherwise has no affiliation. Similarly, a "Custom" or another named location may be defined by users. As seen, the wireless NAP 182 in this location is associated with a cellular base station providing network access through a General Packet Radio Services (GPRS) system, Global System for Mobile communication (GSM) system, third generation wireless 3G system or other kind of mobile wireless communication system.

Additionally, as discussed below, each location may have a predetermined computing policy that defines how and to what extent an endpoint computing asset may operate, such as by communicating with other computing devices and transferring data, surfing the Internet, undertaking downloads, patching applications, etc. In turn, the policy may vary from location to location. Optionally, it is even relevant that the computing policy take into account the actual connection type of the endpoint asset, such as wired or wireless, and/or the specifics thereof, e.g., T1 line, 802.11, VPN, firewall setting, etc. Of course, a "default" policy could be further introduced that sets a minimum or maximum threshold of security, for example, or that exists in situations when the actual location of the endpoint device cannot be ascertained or guaranteed to a policy's satisfaction, or for any other reason.

Figure 2A:
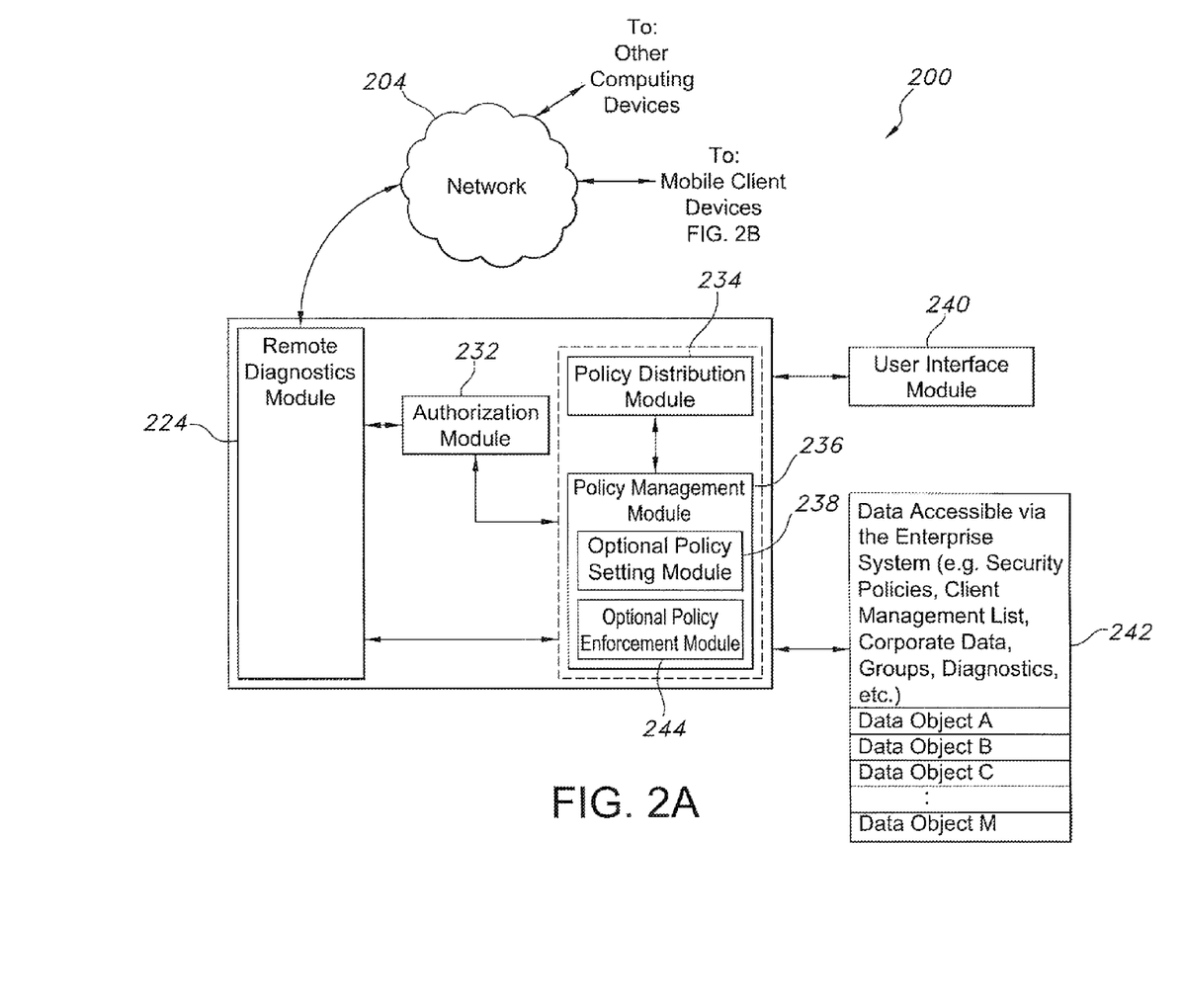
FIGS. 2A and 2B are diagrammatic views in accordance with the present invention of opposite ends of an environment, including enterprise host and client.
Figure 2B:
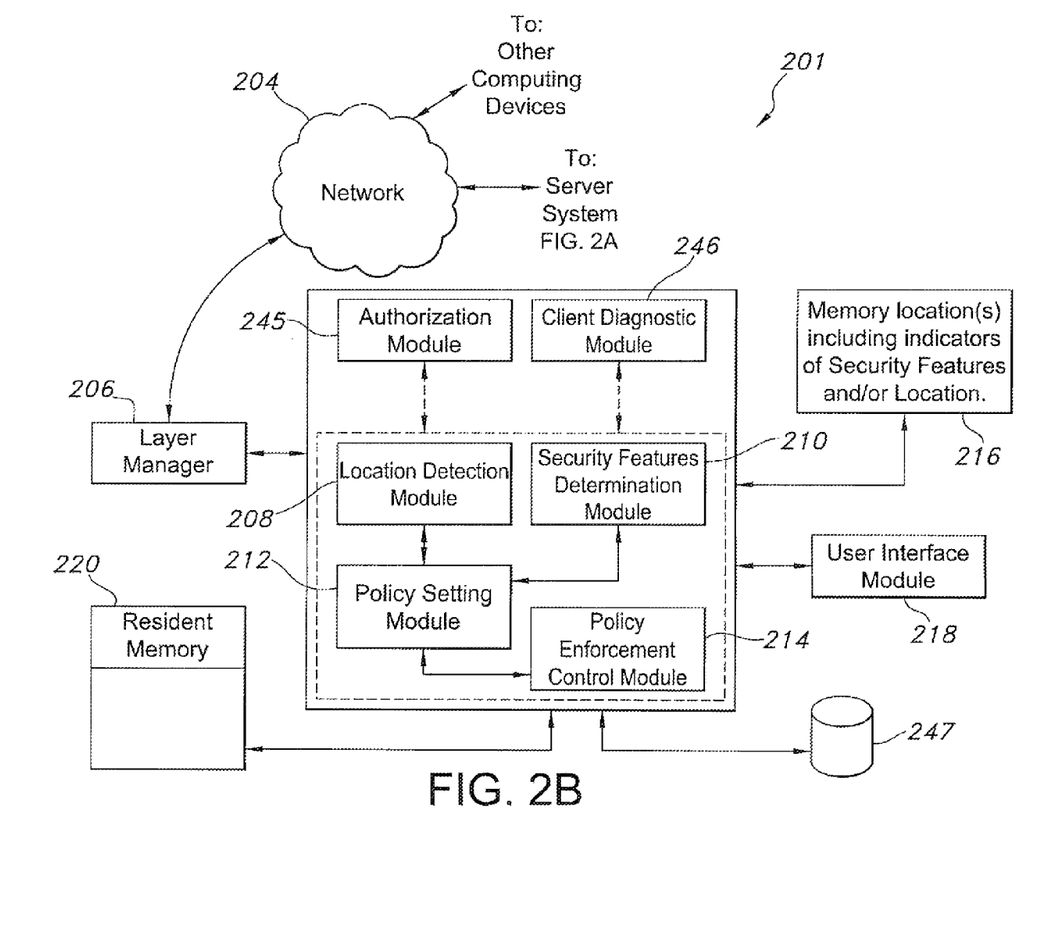

With reference to FIGS. 2A and 2B, a representative illustration of the computing environment of FIG. 1 is used for a computer system 200 (FIG. 2A) acting in a host, server role with respect to an endpoint asset in the form of a mobile, laptop 201 (FIG. 2B) acting in a client role. Similarly, FIGS. 2A and 2B also illustrate interaction between the server computer system 200 and the client 201 for the purpose of establishing/maintaining security policies.

In this regard, the system 200 may be implemented as software executing in a standalone computer having a processor being accessible to memory, the processor being communicatively coupled with one or more network interfaces, a display and input/output devices such as a keyboard and a pointing device. Similarly, the system 200 may be implemented by a series of networked computers as may be typically implemented by an enterprise. Additionally, the system 200 in FIG. 2A may also be implemented in another mobile computing device. As is typical, the server or server-side system 200 allows an administrator to manage and distribute policies and software upgrades, analyze logs, and perform remote diagnostics. Similarly, the client system 201 in FIG. 2B may be implemented as software executing in a mobile computing device having a processor being accessible to memory, the processor being communicatively coupled with one or more network interfaces, a display and input/output devices such as a keyboard and a pointing device. The client side system 201 also monitors the user's changes in location and/or security features and applies the appropriate policies automatically as the user moves about or as different security features are activated or deactivated. The client 201 enforces the policies set up by the administrator, and performs diagnostics. The client 201 can also create and manage policies for the client mobile device when run in a self-managed mode.

In more detail, FIG. 2A illustrates a system 200 having an authorization module 232, a policy distribution module 234, a policy management module 236, illustrated here with an optional policy setting module 238 and an optional policy enforcement module 244, a remote diagnostics module 224 and a user interface module 240.

The policy management module 236 manages security policies. One aspect of managing security policies is defining the policies. In this example, the policy management module 236 comprises instructions for establishing a pre-defined criteria based upon user input processed by the communicatively coupled user interface module 240. Defining policies includes the creation of policies and the modification of policies. Examples of aspects of a policy includes specification of rules and permissions (e.g. policy override), defining one or more locations associated with network environments, defining or identifying security features to be monitored, ports to be monitored, network services to be monitored, applications to be monitored, enforcement mechanisms to be put in place for a particular policy, level identification for a policy or policy aspect for flexibility (optional, recommended, mandatory, invisible), and feedback (e.g. custom error messages) to alert an administrator via a user interface screen using the server system 200 of certain conditions or to alert a client device user via a user interface screen of certain conditions.

There may be several layers of policies. For instance, there may be a base policy applicable to a group of entities. Examples of entities may be users or the mobile devices themselves. In these examples, the group may include one instance of an entity. The attributes of the base policy may be incorporated into other policies which add on additional attributes. For example, a base policy for a group including engineers in a user interface design department may allow access to files on a certain disk drive. Another policy based on location that incorporates the attributes of the base policy may, on the other hand, only allow access to encrypted versions of files if a mobile device through which a UI design engineer is logged in is operating in a "Home" network location. Of course, other examples are readily imagined by skilled artisans.

In other embodiments, the policy management module 236 is provided with an enterprise's existing group structures and the policy management module compensates for a failing in the traditional makeup of groups. That is, since groups are not always hierarchical, it is common for one person to be a member of several groups. To the extent each group has its own security policy, an issue can arise as to how to determine which policy to apply to a particular user. Thus, the policy management module 236 inputs a prioritized list of groups from a memory location 242. The policy management module then searches the groups in priority order of the list. In the event a person is a member of "engineering" and "executive staff," that person will get the security policy for whichever of those two groups comes first in the prioritized list. Alternatively, in the event a user is not a member of any group, there is provided a default policy on the prioritized list.

Connected to the policy management module is the policy distribution module 234. Its function is to distribute security information to the one or more client mobile devices 201. Examples of security information are versions of existing policies, updated policies, software, or the like.

Connected to the policy management module is the authorization module 232. It functions to authorize a communication exchange between the client mobile device and the policy distribution or policy management modules. Primarily, it is a further safeguard against unauthorized or rogue mobile devices trying to hijack the security policies or corporate data of the endpoint device. In this regard, various authorization protocols and techniques may be used. One example is a simple username and password verification scheme. Another example is a cryptographic authentication protocol. The authorization module 232 may also be used to authorize a communication exchange between the client system 201 and the remote diagnostics module 224.

In the remote diagnostics module 224, concern is concentrated on the security or protection of data accessible by mobile client devices. However, the remote diagnostics module 224 may also function to provide diagnostic support for computer problems generally encountered by mobile client devices independently of security related software. In this embodiment, the remote diagnostics module 224 provides diagnostic assistance and/or corrective instructions with respect to problems not only associated with security but also provides such support with other problems generally encountered by mobile client devices. To accomplish this, the remote diagnostics module 224 has a communication interface with each of the user interface module 240, the authorization module 232, the policy management module 236 and the policy distribution module 234. Ultimately, this allows a person using the mobile device to get the device repaired where they are as opposed to having to mail the device or wait until he or she is back in the office ("work" location 106) to get help.

With reference to FIG. 2B, the client 201 includes a location detection module 208, a policy setting module 212, security features determination module 210, a policy enforcement control module 214, a layer manager 206, a user interface module 218, particular memory location(s) 216 in an otherwise attendant memory 220 (ROM, RAM, etc.), an authorization module 245, a client diagnostics module 246, and access to remote or local storage 247, e.g., disk.

In more detail, the authorization module 245 is configured to provide authorization information to the authorization module 232 of the server system 200 to establish communication exchanges with the client mobile device for the exchange of security information or diagnostic information or both. The client diagnostics module 246, on the other hand, collects diagnostic information which is sent to the remote diagnostics module 224 of the server system embodiment 200.

In the layer manager 206, a communications interface is established to one or more of the other modules 208, 210, 212, 214, 245, 246. In function, the layer manager processes network traffic which may include inbound data (e.g. from other computing devices) accessible over a network and outbound copies of data objects from resident memory 220. In this embodiment, the layer manager 206 processes information in one or more layers of a model for communications between computers in a network. An example of such a model is the Open Systems Interconnection (OSI) data communications model. As is known, the OSI includes seven layers arranged as: the physical layer, the data-link layer, the network layer, the transport layer, the session layer, the presentation layer, and the application layer. Of course, another example of a model is the layered Internet Protocol stack. In this regard, skilled artisans understand four layers to be arranged as the subnetwork layer, the Internet layer, the transport layer, and the application layer.

In either, if the layer manager 206 forwards network parameters to the location detection module 208, the location detection module detects or determines the location (e.g., 102, 104, 106, 108, FIG. 1) associated with the current network environment. As a function of the predetermined computing policy for the endpoint from the server system 200, the policy setting module 212 receives, installs and updates security or other information, based on the location. Such may be found as indicators in memory locations 216 read by the policy setting module 212. Alternatively, they may include security policies and/or software updates received from the policy management module 236 via the policy distribution module 234 over the network connection 204. In addition, the policy setting module 212 may define criteria or, if permissions set by the policy management module 236 allow, supplemental policy definitions or customization of policy definitions based upon user input processed by the mobile device user interface module 218. Similarly, if operating in a standalone mode not under the control of the server system, the policy setting module 212 defines an aspect of a policy such as location criteria or security features criteria based upon user input processed by user interface module 218. The policy setting module 212 may also undertake these events periodically, randomly, and/or responsive to a notification message from another module, such as the location detection module 208.

In an alternate embodiment, an optional policy setting module 238 may operate on a server computer system such as the one illustrated in FIG. 2A that determines the selection of the current security policy for the mobile device based on criteria information received from the mobile device including location and activity status of one or more security features or based on network parameters forwarded by the layer manager 206. In this embodiment, a module on the client device such as the policy enforcement control module 214 receives commands from the policy setting module 238 and executes them on the mobile device.

Alternatively still, a user can direct the policy by way of a user interface module 218. As is typical, the user interface module 218 receives input from a user input device such as a keyboard, mouse or touch pad.

In other aspects, a security feature module 210 determines whether one or more security features have an activity status of inactive or active in a communication session between the mobile device and another computer. An example of this is determining whether a connection type to the other computer is wired or wireless. Simply enough, this can be indicated by associating the port over which data is being communicated, e.g., a wireless adapter, a network interface card (NIC), a modem, etc. In another example, further details of the connection may be indicated by subdivision into further distinctions (e.g. wireless: 802.11, GPRS, GSM, 3G, etc., or wired: modem, digital subscriber line (DSL), T1 line, etc). In other embodiments, policies may be set based on these items. For example, a different security policy may be applied for different vendor brands of NICs or particular classes (e.g. 802.3, 802.11a, 802.11b, GPRS, GSM) of NICs. Furthermore, different security policies may be assigned based on a type of operating system (Unix, Linux, Windows, Leopard, etc.) employed or the version (e.g., 3.1, 3.2, 3.3) of the operating system because different systems or versions provide different security features. Furthermore, different policies may be employed based on the security features (e.g. a firewall) provided by different types of network access points (NAP). Additionally, the presence or absence of upgraded NIC support for enhanced security protocols (e.g. 802.11i), or the presence or absence of security software such as virtual private network (VPN), or anti-virus software, or intrusion-detection software may be the basis for setting different policies on a particular port, network adapter or data.

Figure 3:
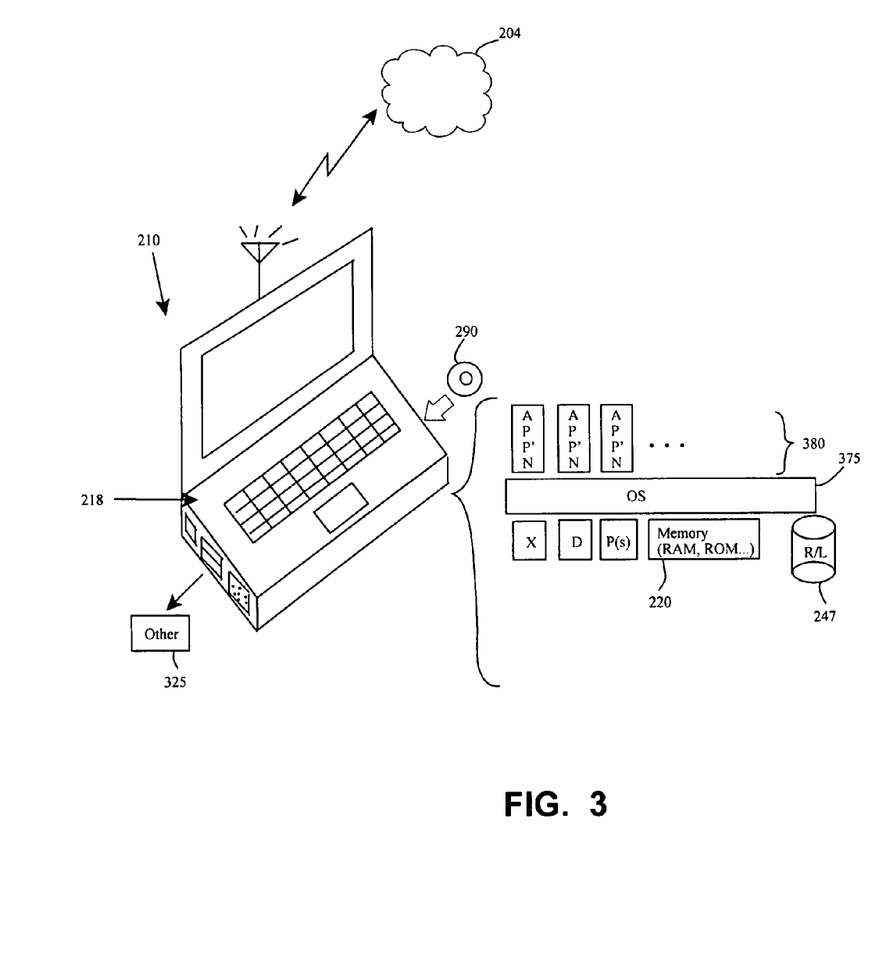
FIG. 3 is a diagrammatic view in accordance with the present invention of a representative endpoint asset in the form of a laptop computing device including policy control module.

Leveraging the foregoing, FIG. 3 begins the detailed illustration of the mechanics for actually securing the network connection by way of the endpoint computing asset (e.g., 201). Preliminarily, however, further tangible items exist on the computing asset 201, in addition to the modules described in FIG. 2B, such as a hardware platform upon which the firmware, operating system 375 and computing applications 380 are found. As is typical, the hardware platform embodies physical I/O and platform devices, memory (M) 240 (RAM, ROM, etc.), one or more processor(s) (P), such as a CPU, drivers (D) and interfaces (X) to internal or other items 325, and access to remote or local storage 247. In a virtual embodiment, a plurality of domains exist each with an operating system and applications. Also, a hypervisor layer serves to schedule control between the various domains relative to the hardware platform. In either, the policy control module can exist as part of the operating system or work in conjunction with it.

Figure 4:
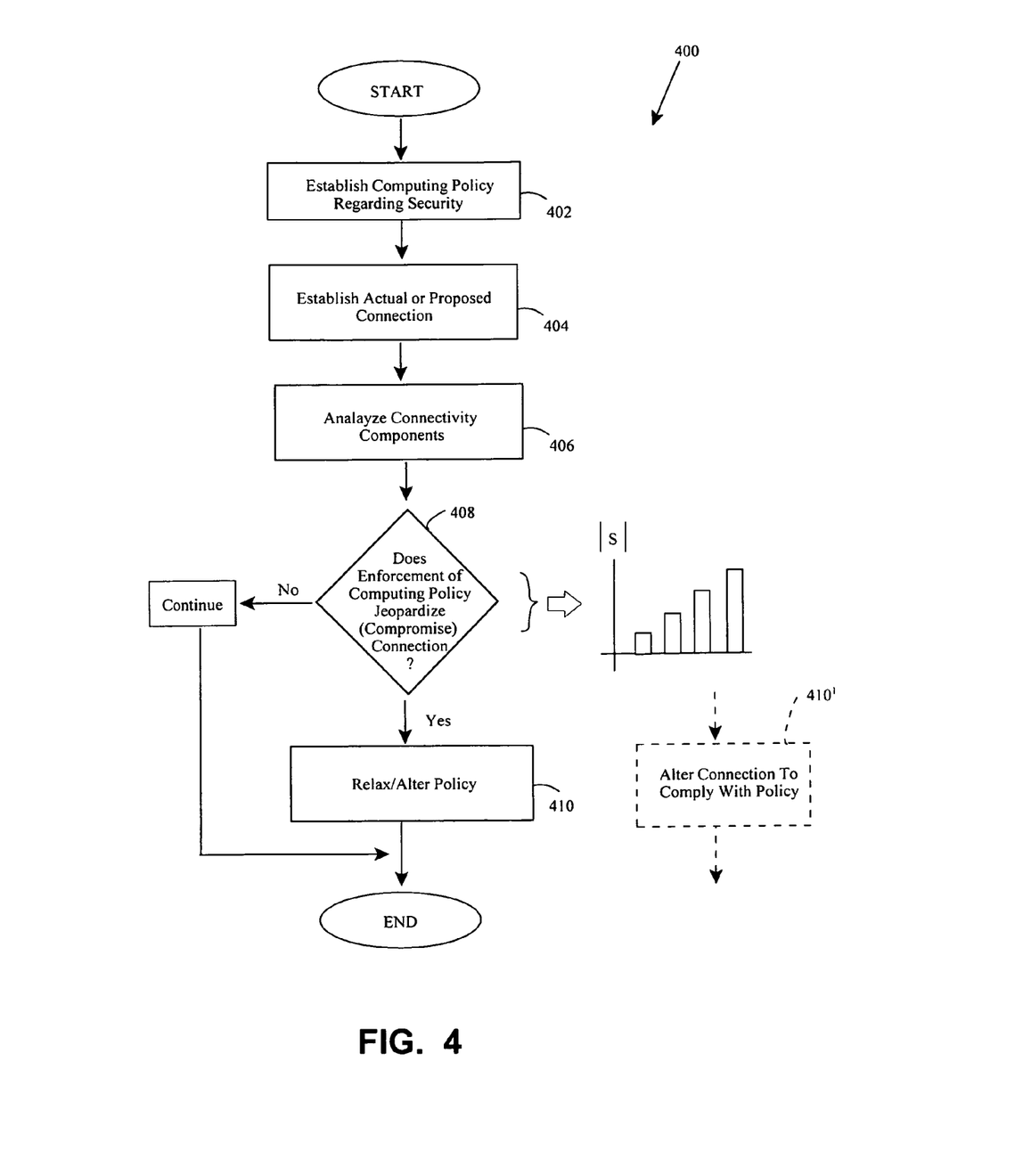
FIGS. 4 and 5 are flow charts in accordance with the present invention for securing a network connection by way of an endpoint computing device.

With reference to FIG. 4, a representative method of securing a network connection is given generally as 400. In a first step, 402, a security policy is established for the endpoint computing device. As before (e.g. FIG. 2B), this can be based on a variety of criteria, such as a location of the device during use, a connection type (WiMAX, Mesh, MANET, etc.), an activity status, user input, user identity/group, etc. It can also be set and developed per independent endpoints, can be foisted upon the endpoint asset from an upstream host (FIG. 2A), can be set by a user, etc. It can also be updated over time.

Once set, however, each endpoint asset may attempt connection in a network to another computing device, step 404. If established, or simply proposed as a hypothetical connection, the connectivity components necessary for the connection are analyzed, step 406. For example, a network interface card of the device may be identified by brand according to its inherent security features. Also, a third party carrier of cellular equipment, e.g., AT&T, may be analyzed to determine what if any policies are established in a connection, such as WiMAX, MANET, Mesh, etc. Then, at step 408, if strict enforcement of the computing policy of 402 will jeopardize or otherwise compromise the connection of the endpoint to another computing device, a relaxed or lesser policy can be enforced, step 410. In this manner, connections will not be lost because of rigid security enforcement in an otherwise hostile computing environment.

Alternatively, step 410', the existing connection might be altered into another connection that could still maintain a stable connection between both devices, but still comply with the policy. Altogether, skilled artisans should now recognize that security policies can be enforced in a network environment not traditionally known for security, but only to the extent that strict compliance with policy does not compromise the connection. In other words, what good is strict enforcement of a security policy if it does not enable a satisfactory connection between devices? Also, it is now the situation that certain network environments that were originally established to maintain connections can now be applied with a security policy that protects the endpoint (and its enterprise owner), while further balancing the frailties of the network. In this regard, analysis of relevant signal strength 409 to a baseline or other metric might be a consideration when determining whether a connection will be lost or maintained.

On the other hand, step 412, if it is determined that full application of the security policy will not jeopardize the computing connection, the process of connection between devices continues.

Figure 5:
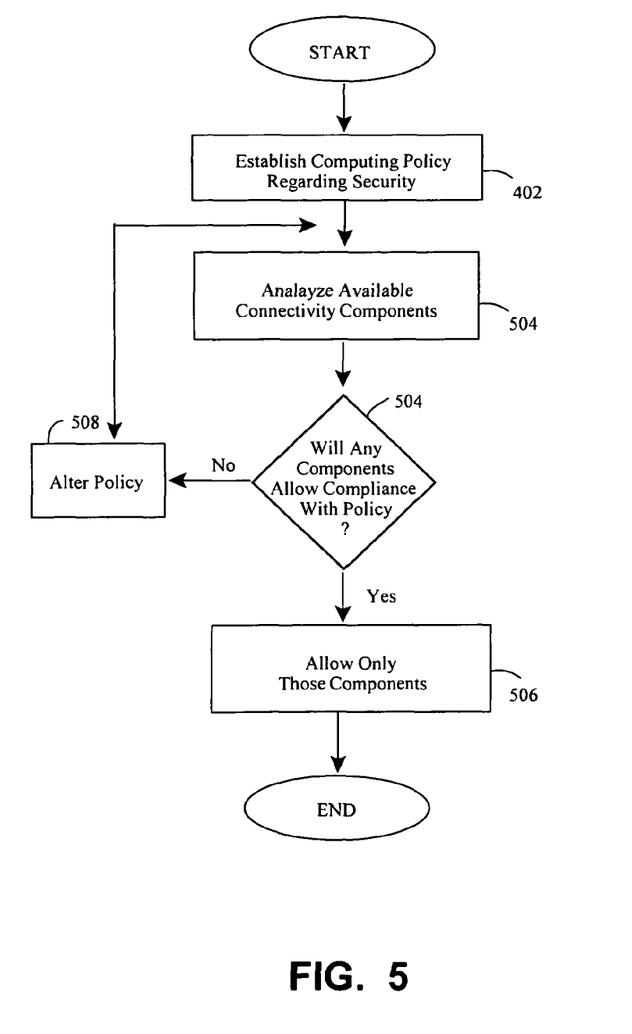

In a variation of the foregoing, FIG. 5 teaches that after setting the security policy, step 402, all the available connectivity components are analyzed regarding the endpoint (e.g., NIC, adapter, modem, etc.) and the environment (e.g., 3G, 802.1x, carrier service, etc.) that could possibly be used to make the connection, step 502. Then, at step 504, if it determined that components indeed exist that will allow a stable or satisfactory network connection and that will allow compliance with the policy, such components are selected for connection, step 506. In this way, a network connection will be known to work beforehand and flexing to lesser or alternate policies, for example, will be avoided. On the other hand, if no connectivity components exist that will simultaneously facilitate the connection and policy compliance, the policy of step 402 is altered at step 508 until such components are eventually found.

Figure 6:
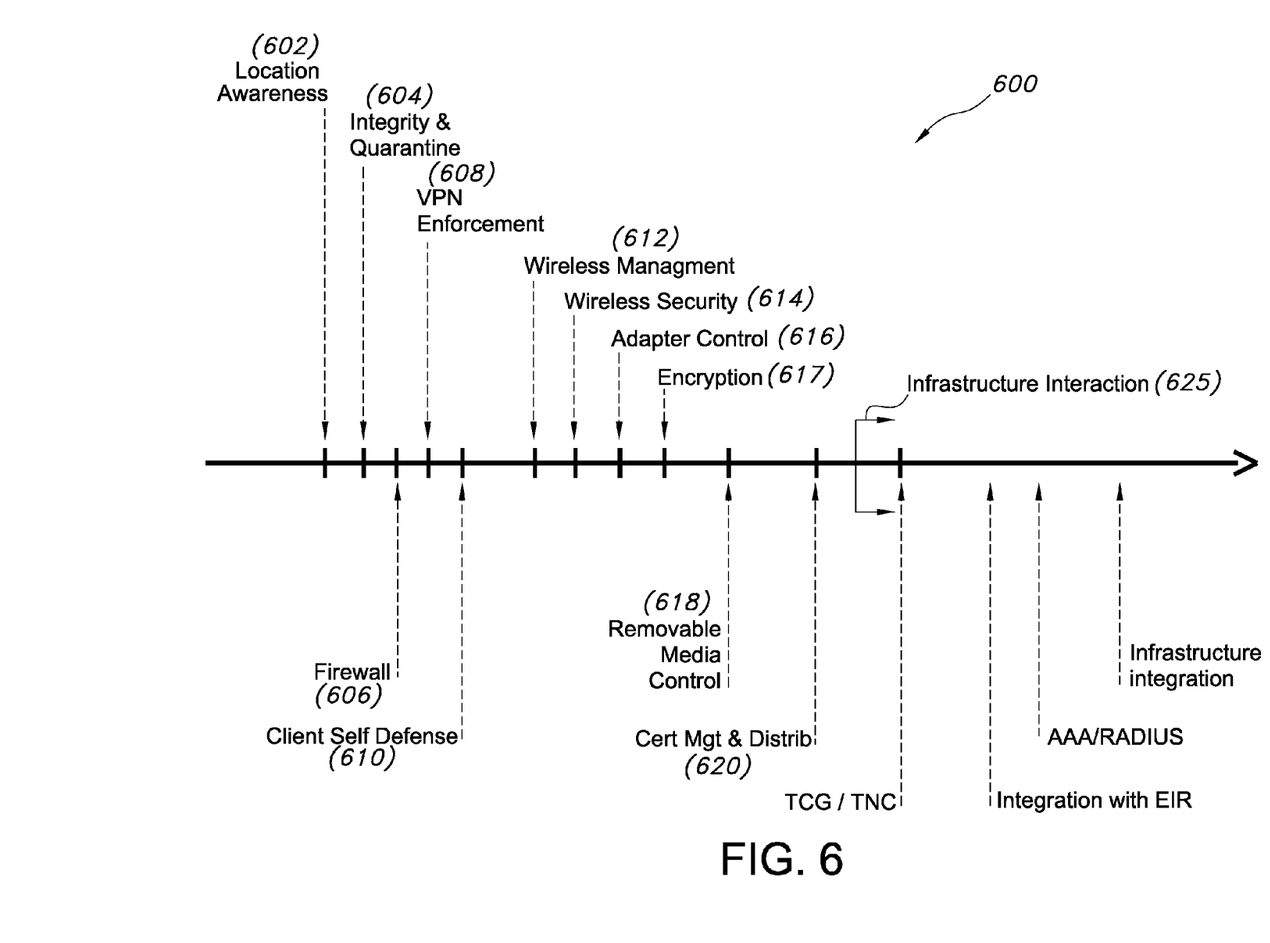
FIG. 6 is a diagrammatic view in accordance with the present invention of representative functionality enforceable by the policies of the endpoint computing device.

With reference to FIG. 6, once a network connection has been made, certain representative functionality that can be enforced by the endpoint computing device is given as 600. It is also given in the context of the modules and their attendant activities described in FIG. 2B, for instance.

At 602, the Location Detection Module of the endpoint asset determines its present location, and tracks this as the asset moves during use.

At 604, it is determined whether the computing device will need to be quarantined from certain network traffic so that other events can occur with the endpoint device, such as quarantines during de/encryption files, OS patches, VPN packages, etc.

At 606, the firewall of the computing device is contemplated for instances of ensuring proper attributes, settings, or the like, especially in accordance with computing policy, according to location.

At 608, VPN enforcement contemplates policies, per a location category such as Mobile 102 in a hotel, that ensure network traffic only occur in a VPN environment, such as when obtaining the application patches.

At 610, client self defense (CSD) contemplates tasks of the client diagnostics module 246 (FIG. 2B) that may be performed to provide diagnostic information to the remote diagnostics module 224 on the server computer system 200. For example, enabling and disabling advanced debugging includes turning on system event logging with options including which parameters to log, when to log, etc. and allowing a debug version of a system component to be installed. In this example, the system event log or portions of it and any special debug output files that debug components are sent to the remote diagnostics module 224 on the server.

At 612, wireless management is invoked when contemplating various wireless protocols, such as 802.1x (as before, FIG. 2) various layers per the layer manager 206 (FIG. 2B) etc. Namely, the policy setting module 212 communicates the current security policy to the policy enforcement control module 214 via a communication interface implemented in the same manner described in any one of the examples discussed above with respect to the location detection module 208 or in any manner known to those of ordinary skill in the art. The policy enforcement module 214 comprises one or more enforcement mechanism modules as specified by the policy. For example, in a communication session between the mobile device and another computer in which data is being transferred over a wireless connection, based on this connection type, in one example, the enforcement module 214 may prevent certain files from being transferred over the wireless connection as opposed to the cases in which the data is being transferred over a some aspect of a wired connection, or the case in which 802.11i cryptography is being used over the wireless connection. Again, in an alternate embodiment, the policy enforcement control module 244 may operate as part of a separate computer system that transfers commands over a network to the mobile device. In the illustrated embodiment of FIG. 2B, a remote diagnostics module 246 processes events and performs audits relating to processing performed by one or more of the modules. The remote diagnostics module 246 transmits over a network 204 diagnostic information to the remote diagnostic module 224 on the server computer system. Examples of tasks that the diagnostics module 246 performs in order to obtain diagnostics information are as follows: Verify that correct files are in correct locations; Verify (e.g. checksum) all files to verify no corruption; Verify time/date stamps for correct versions; Check for outdated installation (INF, PNF) files; Verify that all registry entries are correct and correct any errors found. For example, it is verified whether the indications of the installation of the network interface cards (NICs) is accurate.

At 614, wireless security involves items such as whether the endpoint asset is connecting to the network via a wi-fi protected access (WPA) or a wired equivalent policy (WEP), or filtering certain SSIDs on an NAP, etc.

At 616, adapter control contemplates whether certain motherboards, such as those by Cisco and IBM, require handling of traffic through prescribed adapters.

At 617, encryption contemplates encoding/decoding of data, files, folders, etc. For this, items contemplated include particular encryption schemes, passing of keys, or the like.

At 618, removable media control contemplates the scenario of quarantining the endpoint asset from transferring data to a removable device, such as a flash memory, unless and until the asset is moved behind and used inside an enterprise's firewall. Of course, other removable media contemplate CDs, USB devices, etc., and a variety of ways of allowing or preventing reading and writing are known. This is especially useful in the context of military, government and other highly-sensitive contexts whereby espionage, theft, etc., is of ultimate importance.

At 620, certificates management and distribution considers the necessary and requisite exchange of certificates, handshakes, authentication, etc., at certain websites or in the context of wireless exchanges under 802.1x.

At 625, these items are those involved with the exchange of key pieces of information that are handed to one another. They are also well known in the art and associated with traditional operating systems.

In certain other embodiments, skilled artisans will appreciate that retrofitting existing commercially available software will serve to minimize costs of implementing the foregoing. Thus, Novell's ZENworks Endpoint Security Management (ZESM) products could help secure Mesh/WiMAX/MANET/etc. usage by filtering items through existing policy control mechanisms, namely:

AdHoc SSID and MAC address white listing and black listing;

Access Point SSID and MAC address white listing and black listing;

Minimum WiFi security;

Modem (3G) control (RAS filtering);

Network/Modem Adapter white/black listing—which adapters (cellular for example) are allowed to be used and when or under what circumstances;

Firewall control;

VPN Enforcement;

Application Control;

Integrity Rules; and

Advanced scripting (to integrate with third party applications dynamically).

In new areas of functionality, ZESM could be expanded to deal with other existing, and crucial, means of establishing a MESH network. For instance, it could be modified to:

control any endpoint devices that use the 4.9 GHz spectrum—to control other connectivity means;

provide higher security options for wireless connectivity, e.g., WPA PSK Key Management;

provide higher security connections for wireless and wired connectivity, e.g., 802.1x supplicant;

enforce/control for higher security requirements;

manage certificates as an expansion of 802.1x support;

provide tighter integration (or use Application Control or Scripting) to enforce third party wireless configuration software to do profile/setting enforcement; and provide a policy that combines the elements together.

Figure 7:
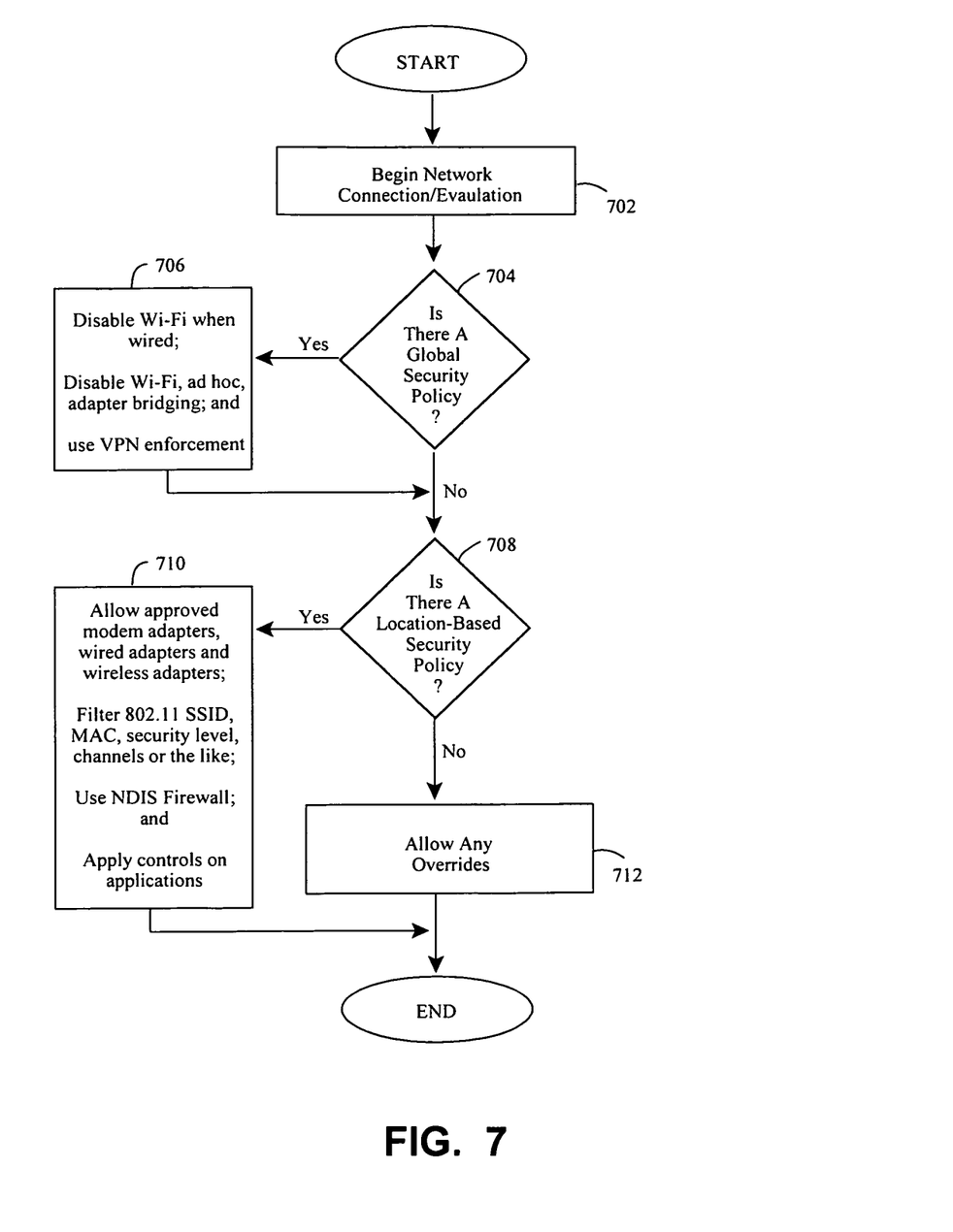
FIG. 7 is a flow chart in accordance with the present invention for securing a MESH or WiMAX network connection by way of an endpoint computing device.

With the foregoing functionality as background, FIG. 7 examines the high-level impact of having variable levels of security based upon either a global, or local level, or both. At 710, a network connection begins from the endpoint computing device as is typical. At 704, it is determined whether a global security policy is in place for the enterprise. If so, certain functionality is desired. Namely, it is preferred to disable wi-fi connections when in a wired environment, disable all of wi-fi, ad hoc and adapter bridging when wireless, and utilize VPN enforcement. On the other hand, if no global security policy exists, examination takes place regarding a local computing policy based on a present location of the endpoint computing device, step 708. To the extent such a policy exists, step 710, it is preferred to use computing connections based on approved connectivity components, such as approved modem adapters, and wired and wireless adapters. Filtering occurs regarding 802.11 SSID, MAC, certain security levels and channels, or the like. Also, it is desired to use 802.11 key management, an NDIS firewall and apply controls to the variety of applications that may be utilized during the connection event.

Lastly, if no policies exist for a global situation or the actual location of the endpoint, certain situations may still exist that allow for connection anyway, step 712. For example, if the endpoint is being used by a corporate officer or otherwise high-ranking person, connection may be granted through the available controls of the endpoint earlier described. Similarly, certain low-level applications may be used during a connection, such as a user being allowed to play internet games at approved websites, etc. On the other hand, if no overrides are allowed, connection will be prevented. Ultimately, this allows for variable levels of security policies (sent to or residential) to be enforced at the endpoint to provide maximum MESH, WiMAX, etc., connectivity while in an environment otherwise created to facilitate connectivity at the expense of security.

In any embodiment, skilled artisans will appreciate that enterprises can implement some or all of the foregoing with humans, such as system administrators, computing devices, executable code, or combinations thereof. In turn, methods and apparatus of the invention further contemplate computer executable instructions, e.g., code or software, as part of computer program products on readable media, e.g., disks 290 (FIG. 3) for insertion in a drive of computing device, or available as downloads or direct use from processor firmware, memory or storage of an upstream computing device. When described in the context of such computer program products, it is denoted that executable instructions thereof, such as those in components, modules, routines, programs, objects, data structures, etc., perform particular tasks or implement particular abstract data types within various structures of the computing system which cause a certain function or group of function, and enable the configuration of the foregoing.

Although the foregoing has been described in terms of specific embodiments, one of ordinary skill in the art will recognize that additional embodiments are possible without departing from the teachings of the present invention. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of other figures.

The invention claimed is:

1. A method of securing an endpoint computing device connection over a network, comprising:

pre-defining a security policy for the endpoint computing device;

establishing a computing connection from the endpoint computing device to another computing device, including analyzing connectivity components of the endpoint computing device and/or the network enabling the computing connection before or after the establishing;

determining whether enforcement of the security policy jeopardizes a continued stability of the computing connection between the endpoint computing device and the another computing device according to the analyzing; and if so, altering the security policy to maintain a continued stability of the computing connection between the endpoint computing device and the another computing device.

2. The method of claim 1, wherein the establishing a computing connection further includes establishing a WiMAX, MESH, MANET or ad hoc computing connection with the another computing device.

3. The method of claim 1, wherein the analyzing the connectivity components further includes determining security policies of carrier companies enabling the computing connection.

4. The method of claim 1, further including determining whether strict enforcement of the security policy jeopardizes the continued stability of the computing connection further includes analyzing a network signal strength of the computing connection.

5. The method of claim 1, wherein the altering the security policy further includes using a different security policy.

6. A method of securing an endpoint computing device connection over a network, comprising:
pre-defining a security policy for the endpoint computing device;
establishing a computing connection from the endpoint computing device to another computing device, including analyzing connectivity components of the endpoint computing device and/or the network enabling the computing connection before or after the establishing;
determining whether compliance with the security policy implicates a lost computing connection between the endpoint computing device and the another computing device; and
if so, altering the computing connection to comply with the security policy and to maintain a continued stability of the computing connection.

7. A method of securing an endpoint computing device connection over a network, comprising:
pre-defining a security policy for the endpoint computing device;
analyzing connectivity components enabling a computing connection from the endpoint computing device to another computing device, including determining which connectivity components of the endpoint computing device and the network will satisfactorily allow the computing connection to comply with the security policy and to maintain a continued stability of the computing connection between the endpoint computing device and the another computing device; and
configuring the computing connection using said determined connectivity components, the network including a WiMAX, MESH, MANET or ad hoc computing connection from the endpoint computing device to the another computing device.

8. The method of claim 7, further including determining whether strict enforcement of the security policy jeopardizes a continued stability of the computing connection between the endpoint computing device and the another computing device; and
if so, altering the security policy.

9. The method of claim 8, wherein the altering the security policy further includes using a different security policy.

10. A method of securing an endpoint computing device connection over a network, comprising:
pre-defining a security policy for the endpoint computing device;
analyzing connectivity components enabling a computing connection from the endpoint computing device to another computing device, including determining whether any connectivity components of the endpoint computing device and the network will satisfactorily allow the computing connection to comply with the security policy and to maintain a continued stability of the computing connection between the endpoint computing device and the another computing device; and
if so, configuring the computing connection using only said determined connectivity components, the network including a WiMAX, MESH, MANET or ad hoc computing connection from the endpoint computing device to the another computing device.

11. The method of claim 10, further including altering the security policy upon said determination that no collection of connectivity components of the endpoint computing device and the network will said satisfactorily allow said computing connection to said comply with the security policy.

12. A network computing system, comprising:
a first computing device and a second computing device each comprising at least one processor operatively coupled to a memory, the first computing device having a control module to enforce a pre-defined security policy for the first computing device regarding at least one computing connection with the second computing device and at least one connectivity component that is used to establish the at least one computing connection in a network, wherein the control module analyzes the at least one connectivity component of the first computing device and/or the network and enforces a different security policy on the at least one connectivity component upon a determination that the at least one computing connection will be compromised if the pre-defined security policy is strictly enforced, whereby a continued stability of the computing connection between the first computing device and the second computing device is maintained.

13. A network computing system, comprising:
a first computing device and a second computing device each comprising at least one processor operatively coupled to a memory, the first computing device having a control module to enforce a pre-defined security policy for the first computing device regarding at least one computing connection with the second computing device and at least one first computing device connectivity component that is used to establish the at least one computing connection in a network having other connectivity components, wherein the control module analyzes the at least one connectivity component of the first computing device and the other connectivity components of the network and determines whether the at least one connectivity component of the first computing device and the other connectivity components of the network will allow the at least one computing connection to comply with the pre-defined security policy and maintain a continued stability of the at least one computing connection between the first computing device and the second computing device.

14. A network computing system, comprising:
a first computing device and a second computing device each comprising at least one processor operatively coupled to a memory, the first computing device having a control module to enforce a pre-defined security policy for the first computing device regarding at least one computing connection with the second computing device and a plurality of connectivity components of the first computing device that can be used to establish the at least one computing connection in a network having other connectivity components, wherein the control module analyzes at least the plurality of connectivity components and determines which of the plurality of connectivity components will allow the at least one computing connection to comply with the pre-defined security policy and maintain a continued stability of the computing connection between the first computing device and the second computing device, and enables configuring the at least one computing connection with only said determined connectivity components.

15. A computer program product embodied in a non-transitory computer readable medium which, when loaded on a computing device, secures a network connection between an endpoint computing device and another computing device, the computer program product having executable instructions that enforce a pre-defined security policy for the endpoint computing device regarding at least one computing connection between the endpoint computing device and the another computing device, that analyze connectivity components of at least one of the endpoint computing device and other connectivity components of the network, and that enforce a different security policy if said analysis of connectivity components determines that the at least one computing connection will be compromised if the pre-defined security policy is strictly enforced, whereby a continued stability of the at least one computing connection is maintained.

16. A computer program product embodied in a non-transitory computer readable medium which, when loaded on a computing device, secures a network connection between an endpoint computing device and another computing device, the computer program product having executable instructions that enforce a pre-defined security policy for the endpoint computing device regarding at least one computing connection between the endpoint computing device and the another computing device, that analyze connectivity components of the endpoint computing device and of the network, and that determine whether said analyzed connectivity components of the endpoint computing device and other connectivity components of the network will actually allow the at least one computing connection to comply with the pre-defined security policy and maintain a continued stability of the at least one computing connection.

17. A computer program product embodied in a non-transitory computer readable medium which, when loaded on a computing device, secures a network connection between an endpoint computing device and another computing device, the computer program product having executable instructions that enforce a pre-defined security policy for the endpoint computing device regarding at least one computing connection between the endpoint computing device and the another computing device, that analyze a plurality of connectivity components of the endpoint computing device, and that determine which of said analyzed plurality of connectivity components of the endpoint computing device will allow the at least one computing connection to comply with the pre-defined security policy and maintain a continued stability of the at least one computing connection.

18. The computer program product of claim 17, further including executable instructions that enable configuring the at least one computing connection with only said determined connectivity components.

19. The computer program product of claim 18, further including executable instructions that enable configuring the only said determined connectivity components with other connectivity components of the network.

\* \* \* \* \*